H. L. KOHLER.
ART OF PURIFYING FIRE CLAYS.
APPLICATION FILED JULY 31, 1918.
1,290,241.
Patented Jan. 7, 1919.
2 SHEETS—SHEET 2.
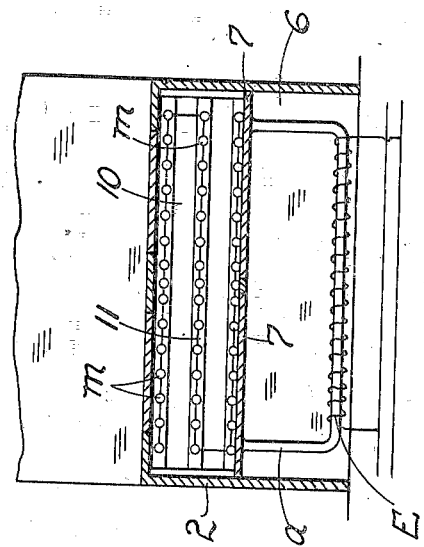
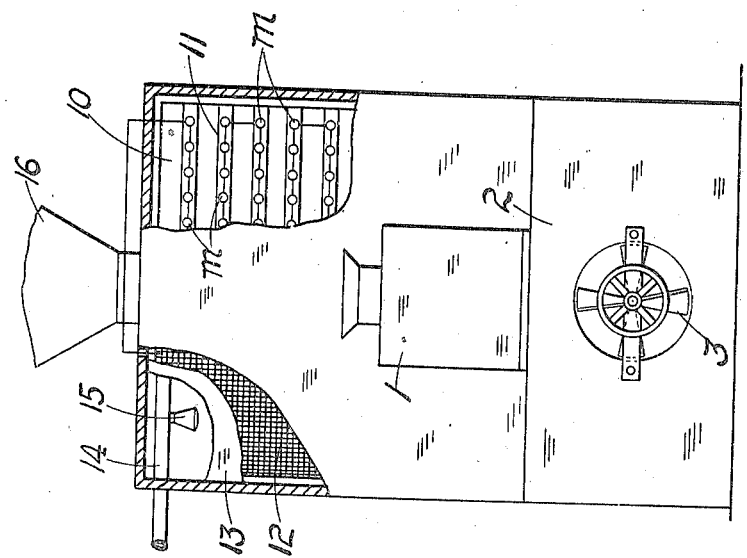
WITNESSES:
Harry A. Beimy
N. E. Brockman
INVENTOR.
Henry L. Kohler.
BY Emil Starek
ATTORNEY.

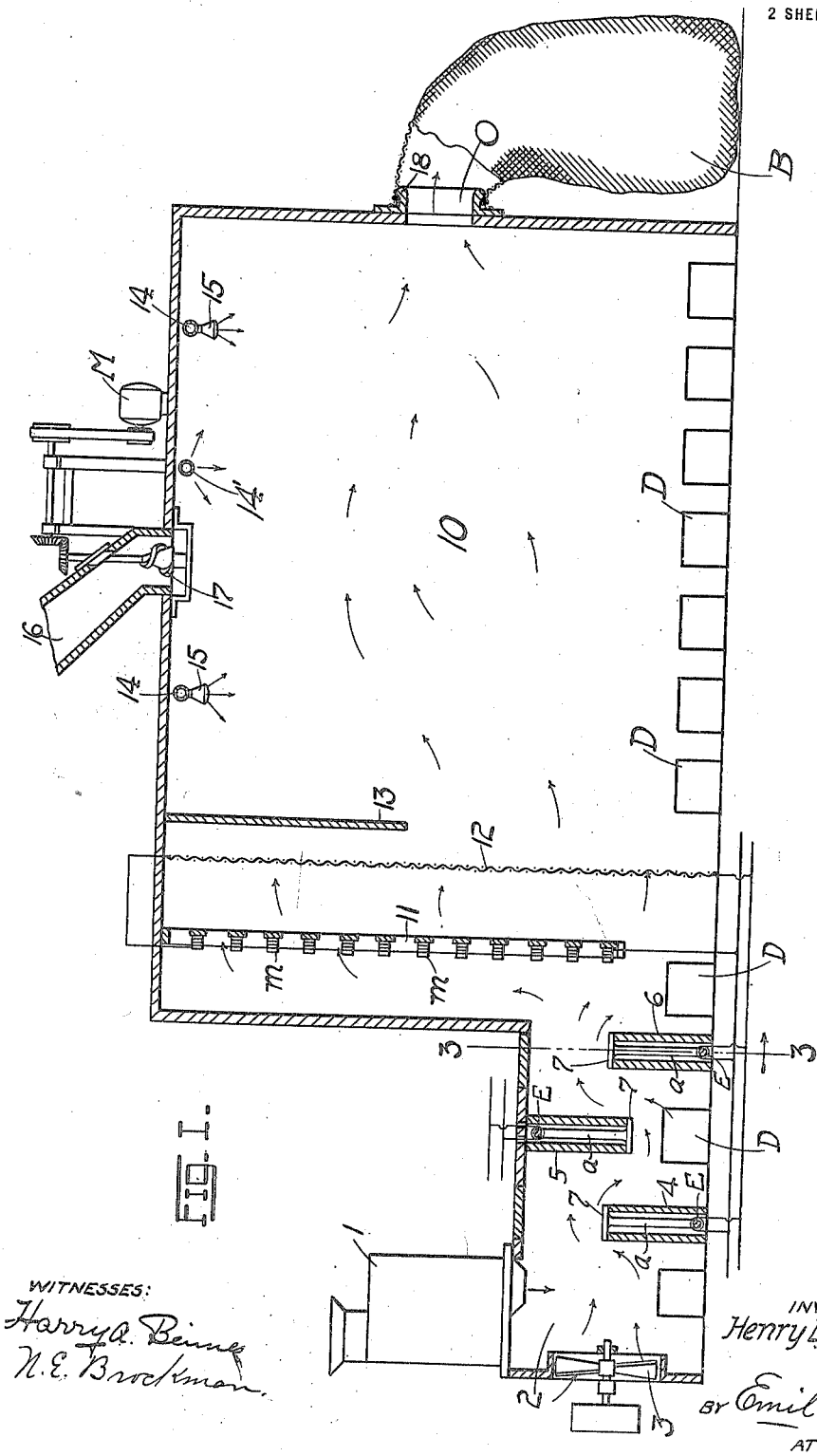

UNITED STATES PATENT OFFICE.

HENRY L. KOHLER, OF ST. LOUIS, MISSOURI.

ART OF PURIFYING FIRE-CLAYS.

1,290,241.   Specification of Letters Patent.   Patented Jan. 7, 1919.

Application filed July 31, 1918.   Serial No. 247,558.

*To all whom it may concern:*

Be it known that I, HENRY L. KOHLER, a citizen of the United States, residing at St. Louis, State of Missouri, have invented certain new and useful Improvements in the Art of Purifying Fire-Clays, of which the following is a full, clear, and exact description, reference being had to the accompanying drawings, forming a part hereof.

The present invention is directed to the purification of fire clays with a view of removing therefrom such impurities as feldspar, silica, magnetic minerals and the like whose presence in a large measure detracts from the refractory character which a pure fire clay should possess. As well understood in the art, pure fire clay or kaolin is a hydrated silicate of aluminum and is formed by the decomposition of aluminous minerals, especially the potash and soda feldspars, the process of forming it consisting in removing the alkalis and leaving the alumina or a large part of it and part of the silica, and adding water. The specific gravity of pure kaolin is less than that of the impurities generally associated with it, the gravity of kaolin being 2.4 to 2.6; that of feldspar 2.44 to 2.75; silica 2.5 to 2.8; magnetite 5; titanite 3.2 to 3.6; brookite 3.8; epidote 3.25 to 3.5; apatite 3 to 3.25; and hornblende 2.9 to 3.4. Of course these various impurities are not present at one time, the usual impurities being feldspar and silica, and iron compounds; but whatever they are or may be, it is desirable to remove them from the aluminum silicate so as to leave the latter in as pure a state as possible for commercial and industrial purposes. In the purification of fire clays by my process, advantage is taken not only of the differences in the specific gravities between the pure kaolin and the associated minerals constituting the impurities, but of the magnetic character of some of these foreign minerals, it being known that magnetite, titanite, brookite, chromite, hematite, pyrrhotite, pyroxene, and a number of other metalliferous compounds are more or less affected when brought under the influence of a magnetic field. The present is essentially a dry process, that is to say, no water is employed in the gravity separation of the mineral particles, the latter being subjected to the action of a blast of air operating on the particles in the region of a magnetic field while the particles are falling or in suspension. The main object sought of course is the separation of the pure clay or hydrated aluminum silicate from the impurities associated with it. Incidentally however I provide means for tempering the clay thus separated, or if need be, I impart thereto, without tempering, any suitable shade by the injection into and mixture therewith of coloring matter in the form of metallic oxids, as for example cobalt oxid, manganese oxid, uranium oxid and the like, depending on the use to which the clay is to be put. In practising the new process involved in the treatment of the clay I do not wish to be limited to any one form of apparatus; and while different types of apparatus may be employed, and the various elements entering into the construction thereof may be changed, yet, the basic features of the apparatus and the general relation of these elements to one another I consider new. The advantages of the invention will be apparent from the following detailed description in conjunction with the accompanying drawings in which—

Figure 1 represents a middle vertical longitudinal section of an apparatus suitable for the practice of my process; Fig. 2 is a front elevation with parts broken away; and Fig. 3 is a vertical cross-section on the line 3—3 of Fig. 1 taken through one of the deflecting walls or baffles.

Referring to the drawings, 1 represents a suitable mill into which the impure clay, previously dried, is charged, the mill grinding the material so as to reduce the particles of the kaolin to a size sufficiently small to pass for example through an 80 mesh screen, the particles of silica (sand) feldspar, and other associated impurities, under the circumstances remaining either unaffected or of a size passing through a minus 80 mesh on account of their greater hardness, it being remembered that the hardness of kaolin ranges between 1 and 2.5, whereas that of silica, the feldspars, and iron compounds ranges from 5 to 7. The 80 mesh size given for the ground particles of kaolin is merely by way of example, as in the practice of the invention the degree of crushing will be varied to meet local conditions and necessarily will depend on circumstances. It may be stated in passing that the clay fed to the mill is dried only to the extent of removing uncombined water, and must not be heated to the point of driving out the water of hydration of the aluminum silicate. The ground material is discharged from the mill into an air chamber 2 where the particles while still in suspension encounter a current of air projected across the path of their fall, by means of a fan or blower 3 located below the mill along the front wall of the chamber 2. The falling particles of the ground clay are blown rearwardly in the chamber 2, encountering in their travel a series of transversely disposed deflecting walls or baffles 4, 5, 6 projecting successively in opposite directions, the upper faces of the baffles 4 and 6, and the bottom face of the intermediate baffle 5, being each provided with a magnetized plate 7 made in two sections, the magnetization being effected by connecting the respective sections of the plate with the terminals of the U-shaped armature $a$ of a solenoid or electromagnet E set in the hollow of the baffle, the solenoid being connected with any suitable source of electric energy (not shown). The manner of installing a magnetic field in the air chamber 2 in connection with the baffles may be varied, the arrangement here shown being merely by way of example. There are many ways not necessary to refer to or even mention by which the baffles might be magnetized, these various methods falling within the purview of the skilled mechanic.

Rearward of and communicating with the air chamber 2 is a large collecting or expansion chamber 10 at the intake end of which is disposed across the chamber a magnetic screen 11 composed of clusters of electromagnets $m$ to which electric energy may be supplied from any suitable source (not shown). Spaced from and rearward of the screen 11 is a filter screen 12 of proper mesh to allow the ground particles of kaolin to pass through it into the chamber 10, a deflecting plate 13 being disposed across the top of the chamber a suitable distance from and rearward of the screen. The filter screen 12 is a resistance screen and is electrically charged, the quantity of current traversing it being only sufficient to maintain the screen at the necessary temperature to dry up any adhering moisture and thus leave the meshes of the screen permanently open to the free passage of the kaolin particles therethrough. The roof of the chamber 10 is provided with pipes 14 equipped with spray-heads 15 for the spraying of water into the chamber for "tempering" the kaolin in cases where "grog" or ground used material is to be added thereto, the grog being fed into the chamber from a suitable hopper 16, by means of a rotating agitator or feed 17 driven by a suitable electric motor M or otherwise. The chamber 10 is likewise provided with one or more perforated spray pipes 14' for spraying coloring matter in powdered form into the chamber when it is desired to impart a suitable color to the kaolin, such coloring matter being in the form of powdered dry metallic oxids such as the oxids of cobalt, manganese, uranium and the like. These coloring materials are added in cases where the step of "tempering" or wetting of the clay is not resorted to. In such cases the dry kaolin (either with or without the coloring matter) is caught in a bag B coupled to the nipple or flange 18 formed about the outlet opening O of the collecting chamber, the air accompanying the powdered material filtering through the meshes of the bag. Necessarily, and obviously, the respective chambers 2 and 10, are provided with doors D wherever required for the discharge and removal of material accumulating in the chambers, different materials dropping at different points according to the relative weight and size of the particles as will be more clearly apparent from a description of the operation of the invention which is substantially as follows:

The clay is first dried to expel all the moisture or uncombined water and thereupon fed to the mill where it is crushed to such a size as not to crush the quartz or feldspar that it may contain, an example of the fineness to which the particles are milled being given above. The powdered clay is then discharged from the mill, dropping through the chamber 2 where the particles while still in suspension encounter the cross air currents from the blower 3 (or its equivalent), it being understood that the electric currents which serve to magnetize the plates 7 of the several baffles 4, 5, and 6, and energize the electromagnets $m$ of the magnetic screen 11, and to heat to proper temperature the resistance filter screen 12 are turned on. As the falling particles of clay encounter the cross air currents in the chamber 2, the particles are blown rearwardly, in which rearward flow they encounter the several deflecting walls or baffles 4, 5, and 6, the heavier sand and feldspar particles being precipitated to the bottom of the chamber from which they are subsequently removed by opening the doors D, the heavier particles of the magnetic minerals being attracted to and held against the magnetized faces or plates 7 of the baffles from which they may at any time be removed by first breaking the current and sweeping the particles to the bottom of the chamber and out through the openings usually closed by the doors D. The lighter magnetic particles are carried rearward by the air currents when they encounter the electromagnets $m$ of the magnetic screen 11, the lightest and comparatively pure particles of the aluminum silicate being carried rearwardly through the filter screen 12, the oversize remaining behind and being removed through one of the doors D. Before passing into collecting chamber 10 the thoroughly screened or sifted clay particles encounter at the top the baffle 13, the purpose of this baffle being to protect the filter screen 12 against the water sprays from the spray heads 15 when tempering of the purified clay is resorted to. The presence of the baffle 13 however is no objection even in cases where the clay, with or without the addition of grog or coloring matter is delivered dry to the bags. Where spraying of water is resorted to (this being usual upon the addition of "grog" or old ground up bricks) to temper the clay so as to readily and thoroughly amalgamate with the grog, the baffle 13 prevents the water from impinging against the screen 12 which should be kept perfectly dry at all times to keep open the meshes for the free passage of the fire clay particles filtering therethrough. The dry condition for this screen is of course insured by the electric current traversing the screen. The fine magnetic particles adhering to the screen 11 may of course be at any time released and brushed from the magnets and removed through any of the doors of the chamber 2.

Where grog is not added to the powdered kaolin in the chamber 10, the pipes 14 and the spray heads 15 are out of commission, and the spray pipe 14' is availed of for delivering and spraying powdered metallic oxids to thoroughly mingle with and color the clay as the mixture is being carried rearward toward the opening O to be received by the bag B.

The details of the apparatus as here shown may be altered in many respects without involving a departure from either the mechanical embodiment of my invention or from the process carried out by the apparatus. The invention of course is not to be restricted to the purifying of clays or fire clays but may be applied to the purification of any loose material containing particles of different specific gravities with or without an admixture of magnetic particles. The magnetic screen 11 may in many instances be dispensed with or temporarily demagnetized, thereby utilizing simply the filter screen 12 for filtering the pure kaolin after the same has passed beyond the influence of the magnetic field in the chamber 2. Features shown in the drawings but not alluded to are well understood in the art and require no description in the present connection.

Having described my invention what I claim is—

1. In the purification of fire clays, the process which consists in subjecting a charge of the dried crushed material while in suspension to the action of air currents in a magnetic field, causing the lighter aluminum silicate particles and associated magnetic particles to traverse said field whereby a portion of the magnetic particles are held back, passing the aluminum silicate particles and the balance of the magnetic particles successively through a magnetic screen and a filter screen, and recovering the particles of aluminum silicate.

2. In the purification of fire clays, the process which consists in subjecting a falling charge of the dried crushed material to the action of air currents moving transversely or across the path of the falling particles whereby the heavy sands and feldspars are allowed to drop and the lighter particles are carried along with the air currents, causing the currents to circulate around one or more deflecting plates presenting magnetized depositing surfaces for the intercepted magnetic particles, and carrying the force of the currents to a point past the magnetic field of the deflecting plates and recovering the pure silicate of aluminum.

3. In the purification of fire clays, the process which consists in subjecting a falling charge of the dried crushed material to the action of air currents moving across the path of the falling particles whereby the heavy sands and feldspars are allowed to drop and the lighter particles held suspended in the currents, causing the charged currents to traverse a circuitous path in the region of a magnetic field presenting depositing surfaces to the magnetic components of the charge, carrying the charged currents beyond the influence of the magnetic field, and recovering the pure silicate of aluminum.

4. In an aparatus for purifying minerals, a suitable mill, an air chamber below the mill for receiving the material discharged from the mill, means for causing air currents to move across the path of the falling material, a series of baffles in the chamber about which the currents may circulate, magnetized plates carried by the baffles, a collecting chamber leading from the air chamber aforesaid, a filter screen in the collecting chamber, and a magnetic screen interposed between said filter screen and the baffles aforesaid.

In testimony whereof I affix my signature, in presence of two witnesses.

HENRY L. KOHLER.

Witnesses:
 EMIL STAREK,
 N. E. BROCKMAN.